(12) United States Patent
Messina et al.

(10) Patent No.: US 7,567,720 B2
(45) Date of Patent: Jul. 28, 2009

(54) RASTER TO VECTOR CONVERSION OF A DIGITAL IMAGE

(75) Inventors: Giuseppe Messina, Giardini Naxos (IT); Mirko Ignazio Guarnera, Gela (IT); Gianluca Barbera, Messina (IT); Sebastiano Battiato, Acicatena (IT); Giovanni Gallo, Catania (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 674 days.

(21) Appl. No.: 11/271,499

(22) Filed: Nov. 10, 2005

(65) Prior Publication Data
US 2006/0104529 A1 May 18, 2006

(30) Foreign Application Priority Data
Nov. 12, 2004 (IT) .............................. RM04A0562

(51) Int. Cl.
*G06K 9/36* (2006.01)
*G06K 9/46* (2006.01)

(52) U.S. Cl. ...................................... 382/243; 382/203
(58) Field of Classification Search ................. 382/209, 382/214, 215, 217, 218, 190, 201, 202, 203, 382/243
See application file for complete search history.

(56) References Cited

U.S. PATENT DOCUMENTS 5,050,222 A * 9/1991 Lee ............................. 382/176
6,538,658 B1 * 3/2003 Herrera ...................... 345/582

OTHER PUBLICATIONS

Dyn, et al; "Data Dependent Triangulations for Piecewise Linear Interpolation"; Journal of Numerical Analysis; Jan. 1990; pp. 137-154; vol. 10; Oxford University Press, England.
Yu, et al. "Image Reconstruction Using Data-Dependent Triangulation"; IEEE Transactions on Computer Graphics and Applications; May/Jun. 2001; pp. 62-68.
Lee "Wavelet-Based Multiresolution Surface Approximation from Height Fields"; Dissertation Submitted to Virginia Polytechnic Institute and University; Feb. 1, 2002; pp. 1-191; Blacksburg, VA.

* cited by examiner

*Primary Examiner*—Yon Couso
(74) *Attorney, Agent, or Firm*—Hogan & Hartson LLP

(57) ABSTRACT

A raster to vector conversion method of an initial digital image including a pixel matrix, includes generating a digital image divided into polygons by dividing the initial digital image into a plurality of base triangles and defining similarity criteria depending on at least one parameter. The conversion method also includes an iterative operation to process the digital image divided into polygons, selecting pairs of polygons adjacent to each other and to satisfy the similarity criteria and merging together the selected polygons.

24 Claims, 5 Drawing Sheets

Img_T

RASTER TO VECTOR CONVERSION OF A DIGITAL IMAGE

RELATED APPLICATION

The present application claims priority of Italian Patent Application No. RM2004A000562 filed Nov. 12, 2004, which is incorporated in its entirety herein by this reference.

FIELD OF THE INVENTION

The present invention relates to the technical field of digital image processing and, in particular, to a raster to vector conversion method of a digital image.

BACKGROUND OF THE INVENTION

Digital images are currently used in many applications, for example in new generation acquisition devices such as digital cameras or DSC (Digital Still Cameras). Furthermore, digital images are becoming more and more widely used in portable multimedia communication terminals.

Typically, a digital image is represented by a pixel matrix. The total number of pixels present in said matrix defines the spatial resolution of the image. Each pixel is identified by a pair of spatial coordinates that correspond to the position of the pixel inside the matrix and by one or more digital values associated to it, each of which represents a parameter of the pixel.

For example, three digital values are associated with each pixel in an RGB format color digital image, representative of the following parameters respectively: intensity of the red color component, intensity of the green color component and intensity of the blue color component.

In various applications, representation of a digital image as a pixel matrix is not optimal because, for example, storage of the pixel matrix can require a large quantity of memory. Moreover, a digital image represented by a pixel matrix cannot be enlarged at will without this leading to a considerable loss in quality of the enlarged image.

For this reason, a different form of representation is sometimes used, for example a representation known in the art as vector representation (or vector format).

Essentially, in a vector format, the image is represented as a plurality of non-overlapping regions or areas, also called primitives, which altogether cover the entire image. The information necessary to define the contours of said regions are stored, while the information regarding the pixel parameters comprised in each region are summarized in a few parameters generically associated with the entire region or only associated with a limited number of pixels in the region. It can be seen from the above that transformation of a digital image originally represented by a pixel matrix to a corresponding image represented by a vector format leads to a reduction in the information contained in the initial image and, therefore, to its approximation. The quantity of memory required for storage of the image is therefore reduced compared to the memory required for an image represented as a pixel matrix.

It has been observed, furthermore, that in particular applications, such as enlarging techniques and processing techniques in general that require an increase/decrease (i.e. resizing) in the spatial resolution of the image, vector representation is more convenient and efficient than pixel matrix representation.

A class of methods belonging to the state of the art to obtain a vector representation (or raster to vector conversion) starting from a digital image formed by a pixel matrix, provides for the use of triangulation, i.e. dividing into triangular areas of the initial image.

For example, triangulation techniques are known that operate by exploiting the information contained in the image (represented by the digital values associated to the parameters of the image pixels) and techniques where said type of information is not taken into consideration. These techniques are commonly indicated as "data dependent triangulation techniques" and "data independent triangulation techniques".

For example, a data dependent triangulation technique is described in the publication "Data dependent triangulations for piecewise linear interpolation" by N. Dyn, D. Levin and S. Rippa, IMA Journal of Numerical Analysis, vol. 10, pp. 137-154, January 1990.

A data independent triangulation technique has been known since 1934 named "Delaunay triangulation".

It has been observed how numerous raster to vector conversion methods belonging to the state of the art, even if widely used, do not guarantee satisfactory performance in terms of the dimensions occupied by the vectorized images and in terms of the measured or perceived quality of said images.

SUMMARY OF THE INVENTION

According to the present invention, a raster to vector conversion method is provided without the above-described disadvantages of the methods known in the art.

A raster to vector conversion method of an initial digital image including a pixel matrix, includes generating a digital image divided into polygons by dividing the initial digital image into a plurality of base triangles and defining similarity criteria depending on at least one parameter. The conversion method also includes an iterative operation to process the digital image divided into polygons, selecting pairs of polygons adjacent to each other and to satisfy the similarity criteria and merging together the selected polygons.

A computer product to execute the raster to vector conversion of a digital image can be directly loaded into an internal memory of a computer, including portions of code to perform the operations described above.

BRIEF DESCRIPTION OF THE DRAWINGS

Further features and advantages of the present invention will become more apparent from the following detailed description of a preferred but non-limiting embodiment thereof, as illustrated in the accompanying drawings, wherein.

In the figures, equal or similar elements are referred to with the same reference symbols.

DETAILED DESCRIPTION

Figure 1:
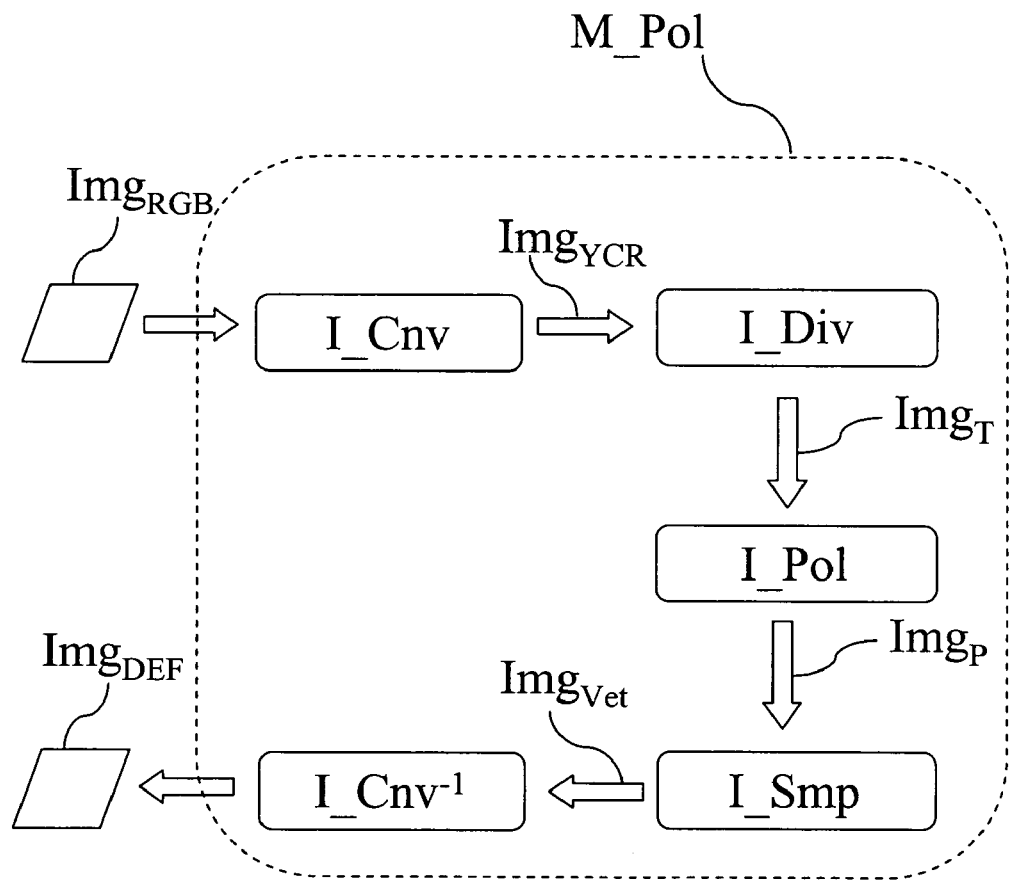
FIG. 1 shows a simplified block diagram of a raster to vector conversion method according to the invention.

FIG. 1 schematically represents a block diagram of a raster to vector conversion method M_Pol according to an embodiment of the invention.

The raster to vector conversion method M_Pol processes an initial digital image to produce an output digital image in a vector format.

The raster to vector conversion method M_Pol can, for example, be carried out inside the same device used to acquire the initial digital image. The image acquisition means and the processing and storage means necessary to carry out said method inside an acquisition device are known to those skilled in the art and, therefore, are not described in further detail.

Alternatively, the raster to vector conversion method can be carried out by means of a personal computer or other similar processing means but in any case different from the image acquisition device. In this case, the initial digital image can be transferred from the acquisition device to be stored in suitable memory resources of the computer, and then processed by means of a program or computer product, including code instructions which, if loaded and executed inside the personal computer, process said image according to the raster to vector conversion method schematically represented in FIG. 1.

As shown in FIG. 1, the raster to vector conversion method M_Pol, preferably comprises the following blocks or modules: a first conversion module I_Cnv, a triangulation module I_Div, a polygonization module I_Pol, a polygon simplification module I_Sp and an inverse conversion module I_Cnv$^{-1}$.

$Img_{RGB}$ schematically indicates the initial image input to the raster to vector conversion method M_Pol. The initial image $Img_{RGB}$ is represented by means of a pixel matrix. Each pixel is defined by a pair of spatial coordinates, corresponding to the position of the pixel inside the matrix, and by one or more digital values associated to it, each of which represents an intensity parameter of the pixel.

Preferably, the initial digital image $Img_{RGB}$ is a color digital image in RGB format, where three digital values are associated to each pixel, representing the following parameters respectively: intensity of the red color component, intensity of the green color component and intensity of the blue color component.

Each digital value is, for example, stored on sixteen or twenty-four bits.

More preferably, the digital image $Img_{RGB}$ input to the method M_Pol is a digital image acquired by means of a CCD type sensor (Charge Coupled Device), or CMOS (Complementary Metal Oxide Semiconductor), comprising an optical filter CFA (for example, Bayer matrix) later subjected to a color interpolation step to be transformed into an RGB image.

With reference to the block diagram of FIG. 1, a conversion block indicated with I_Cnv converts the initial digital image $Img_{RGB}$ in RGB format into another digital image $Img_{YCR}$ in YCbCr format (luminance-chrominance format).

In order to perform said conversion, it is possible to use conversion formulae known to the skilled in the art and easily found in literature. The digital image converted into YCbCr format is, therefore, an image represented by means of a pixel matrix where three digital values are associated with each pixel, representing the following parameters respectively: luminance intensity, intensity of the blue chrominance and intensity of the red chrominance.

The conversion block I_Cnv is entirely optional and is necessary only if the intensity values of the pixels of the digital image in the YCbCR space rather than in the RGB space are to be represented.

However, if the initial images are color images, the properties of the two spaces differ considerably, and representation in the YCbCR space is preferable for subsequent processing, especially if the images generated by the M_Pol method are to be seen by human beings.

With gray-scale images however, there exists no difference between representation in the two color spaces, the same values in the first component (Y and G respectively) are present while the remaining two components (Cb and Cr for one, B and R for the other) have null values, given the absence of information on the chrominance. Therefore, in the case where the method operates with gray-scale initial images, no conversion whatsoever would be necessary.

Returning to the block diagram in FIG. 1, the triangulation block or module I_Div provides an input for the digital image $Img_{YCR}$, in this example in YCbCR format, processes said image by means of a triangulation step and outputs a digital image $Img_T$ divided into triangles or better divided into polygons exclusively comprising triangles (also base triangles).

Figure 2:
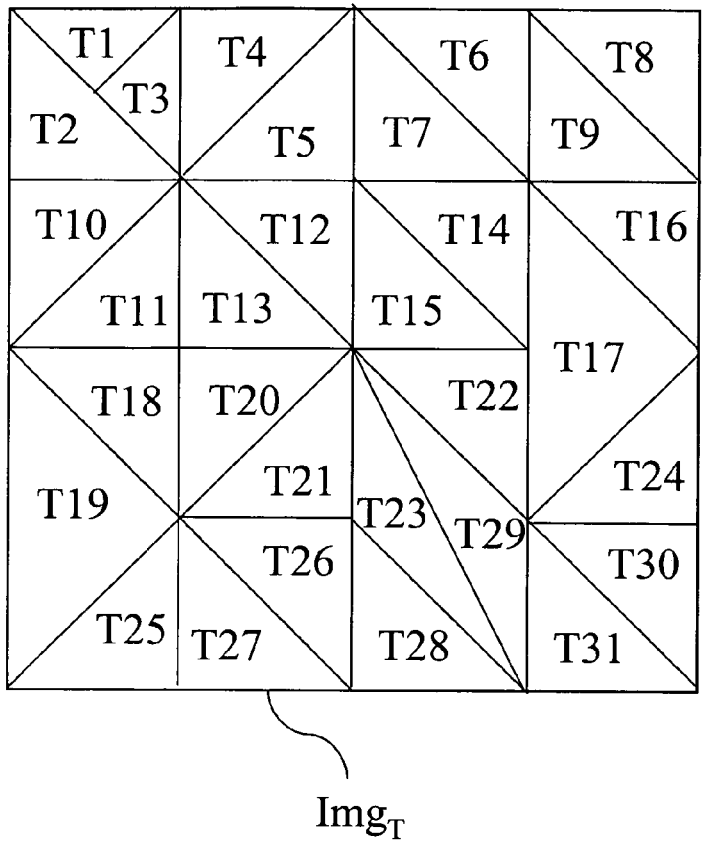
FIG. 2 shows a schematic example of a possible division into triangles of a digital image.

FIG. 2 schematically represents a particular example of an image $Img_T$ divided into a plurality of base triangles T1, . . . , T31. It should be considered that the representation in FIG. 2 is only schematic and corresponds to a very rough example of triangulation. In practice, to obtain good approximation of the digital image, much finer triangulation is required.

The triangulation step carried out by the block I_Div makes it possible to divide the entire area or plane of the initial image $Img_{YCR}$ into a plurality of non-overlapping triangular areas or regions T1, . . . , T31. Each of these regions, or base triangles, includes a plurality of pixels of the initial image $Img_{YCR}$ and is, for example, defined by the coordinates of the pixels located near the vertices of the triangle.

On the basis of the particular type of triangulation technique used, the base triangles can satisfy some particular criteria or constraints. For example, different types of constraints can be imposed on triangulation, such as: the size of the base triangles, or the shape of said base triangles, or a constraint establishing that each side of the triangle must be in common with three distinct respective adjacent triangles.

In an embodiment of the present invention, the triangulation block I_Div performs a triangulation step according to a technique known in the art as Data Dependent Triangulation (DDT).

More preferably, the triangulation technique used is a data dependent triangulation of the locally optimal type, i.e. such as to optimize a predetermined cost function.

DDT, unlike traditional triangulation methods (such as the above-mentioned Delaunay triangulation), productively also exploits the information provided by the parameters associated to the pixels of the image in order to minimize the visual impact of the inevitable approximation errors. Advantageously, DDT permits limited introduction of smoothing and artifacts especially at high frequencies.

The name "Data Dependent" derives from the fact that the triangulation choice is carried out in conformity with optimality criteria that depend not only on the position of the pixels but also on all the information associated to the pixels. In fact, said criteria take into account the tri-dimensional geometric properties of the interpolator planes instead of only the bi-dimensional geometric properties of their projection onto the image plane.

Different DDT techniques are known, for example described in the article "Data Dependent Triangulations for Piecewise Linear Interpolation", by N. Dyn, D. Lewin and S. Rippa, IMA Journal of Numerical Analysis, vol. 10, pp. 137-154, January 1990 and in the article by X. Yu, B. S. Morse and T. W. Sederberg, "Image Reconstruction Using Data-Dependent Triangulation", IEEE Transactions on Computer Graphics and Applications, pp. 62-68, May/June 2001, where in particular a DDT technique of the locally optimal type is described.

In an alternative embodiment, triangulation is carried out by means of a technique different from DDT, known as Wavelet Based Triangulation (WBT), described for example in the doctorate thesis "Wavelet-Based Multi-resolution Surface Approximation from Height Fields" by S. Lee, Virginia, Polytechnic Institute and State University, Blacksburg, February 2002.

Figure 3:
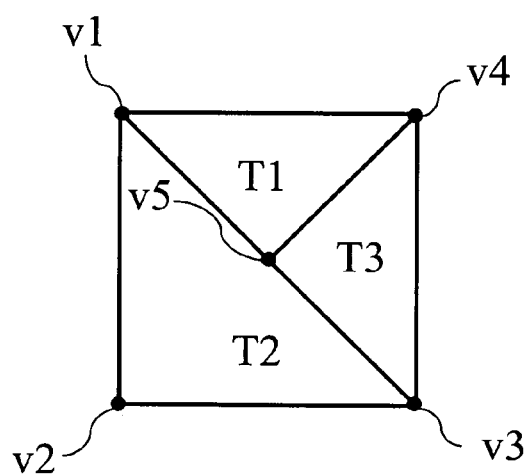
FIG. 3 schematically shows an enlarged portion of the digital image in FIG. 2.

FIG. 3 shows an enlarged portion of the image divided into triangles $Img_T$ schematically illustrated in FIG. 2. In particular, FIG. 3 shows a portion of the image including three base triangles T1, T2 and T3. Each triangle is univocally defined by the pixels located near the vertices. For example, triangle T1 is defined by the three pixels located near its vertices v1, v3, v4. In the example in FIG. 3, triangle T1 is adjacent to triangle T3, with which it has in common the side v4-v5, and it is adjacent to triangle T2. More in detail, a side v1-v5 of triangle T1 corresponds to a portion of the side v1-v3 of triangle T2.

In an embodiment of the present invention, independently of the particular triangulation technique used, the image $Img_T$ divided into triangles (i.e. divided into polygons exclusively comprising triangles), output by the division step I_Div, is represented by means of suitable data structures that make it possible to store, for each triangle, the positions of the pixels located near its vertices and respective digital intensity values (luminance Y and chrominance Cb, Cr).

In other words, the digital image $Img_T$ output by the dividing step I_Div has a vector representation whose primitives are exclusively triangles.

Advantageously, this choice makes it possible for the subsequent processing steps to operate on a smaller quantity of data compared to the quantity of data necessary to represent the initial image.

Returning to the block diagram in FIG. 1, a subsequent module I_Pol produces, starting from the image $Img_T$ divided into base triangles, an image $Img_P$ divided into polygons originating from the merging of said base triangles and possibly further comprising a residual subset of said base triangles.

Hereinafter, the expression "compound polygon" shall indicate a polygon deriving from the merging of at least two base triangles and which, therefore, comprises at least two base triangles (components). Furthermore, also a polygon obtained following the merging of a compound polygon with a base triangle or with another compound polygon is still a compound polygon. It should also be noted that a compound polygon deriving from the merging of two or more base triangles can still be a triangle but it cannot be defined as a base triangle.

In an embodiment of the present invention, the processing step carried out in the module I_Pol is iterative, i.e. it comprises several consecutive processing steps.

For example, at the end of a first iterative step starting from the image $Img_T$ divided into base triangles (or divided into polygons exclusively comprising base triangles), an image $Img_{PL1}$ is formed divided into first polygons comprising:
polygons originating from the merging of pairs of adjacent base triangles (i.e. compound polygons); and possibly a residual subset of said base triangles.

For the purposes of this description, a pair of adjacent triangles or, more in general, of adjacent polygons, is a pair of geometrical non-overlapping shapes, having one side in common or such that one side of one geometrical figure intersects at more than one point with one side of the other geometrical figure.

At the end of the second iterative step, subsequent to said first step, starting from the image $Img_{PL1}$ formed at the end of the first step, a new image $Img_{PL2}$ is formed divided into second polygons comprising:
polygons originating from the merging of pairs of first adjacent polygons; and possibly comprising
a residual subset of said first polygons.

In a subsequent iterative step, the second adjacent polygons can also be merged together and so on. The procedure for any subsequent iterative steps is the same as the two above-described iterative steps.

Figure 4:
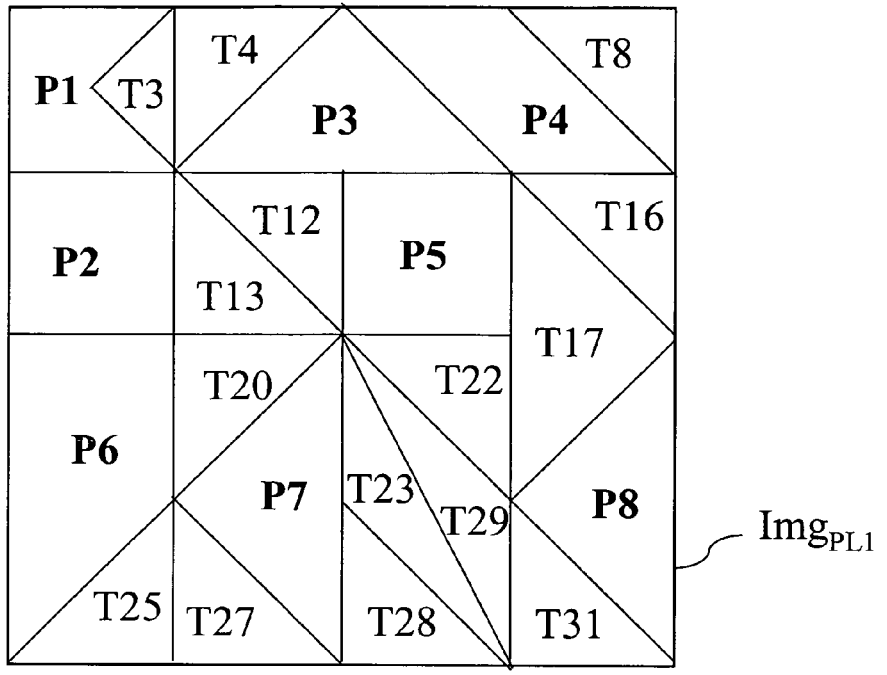
FIG. 4 shows a first example of division into polygons of the digital image in FIG. 2.

FIG. 4 shows a possible example of a digital image $Img_{PL1}$ obtained from the digital image in FIG. 2 at the end of the first iterative step. The digital image in FIG. 4 comprises first polygons of the type:
polygons P1, . . . , P8 (compound polygons) originating from the merging of pairs of adjacent base triangles; and possibly
a residual subset of said base triangles (e.g. T3, T4, T8, . . . ).

For example, the compound polygon P1 originated from the merging of the base triangle T1 with the base triangle T2.

Figure 5:
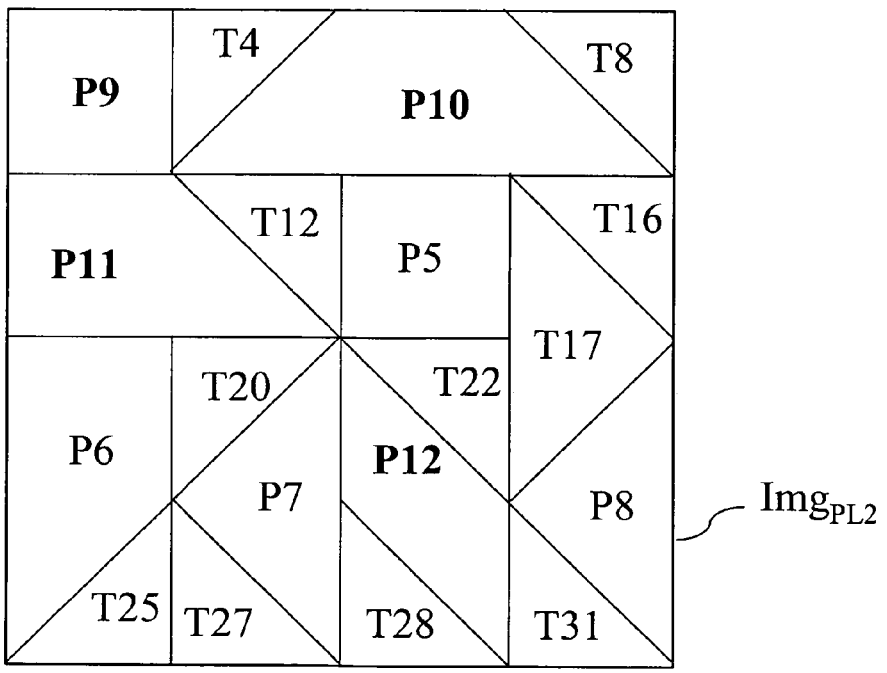
FIG. 5 shows a second example of division into polygons of the digital image in FIG. 2.

FIG. 5 shows a possible example of a digital image $Img_{PL2}$ obtained from the digital image in FIG. 4 at the end of the second iterative step. The digital image in FIG. 5 comprises second polygons of the type:
polygons P9, . . . , P12 originating from the merging of pairs of adjacent first polygons; and
a residual subset of said first polygons (e.g. T4, T8, T12, P5).

For example, the polygon P9 originated from the merging of the compound polygon P1 and the base triangle T3. Therefore, the polygon P9 includes the following components: T1, T2, T3.

However, the compound polygon P10 is obtained from the merging of the compound polygons P3 and P4 (therefore including components T5, T6, T7, T9).

Advantageously, merging between two geometric figures (i.e. between two base triangles, between a base triangle and a compound polygon, between two compound polygons) is carried out once a similarity test has been passed. The similarity test can be considered passed if the two geometric figures satisfy a predetermined criterion or similarity predicate.

In an embodiment of the present invention, the predetermined similarity criterion can be modified between one iteration and the next, so that a similarity requirement coupled to said criterion can be slackened (or relaxed, in other words, made less demanding) between one iteration and the iteration immediately following. More preferably, said similarity criterion depends on at least one input parameter that can be modified between one iteration and the next.

In a first embodiment (which is called "comparison mode based on triangles"), in order to evaluate the similarity between a first and a second geometric figure, the similarity between two adjacent base triangles comprised in said geometric figures is evaluated. In other words:
if the two geometric figures are base triangles, the similarity is simply evaluated between said base triangles;
if the first geometric figure is a base triangle and the second a compound polygon, the similarity is evaluated between said base triangle and a further base triangle adjacent to it and comprised in the compound polygon;

if the two geometric figures are compound polygons, the similarity is evaluated between two adjacent base triangles belonging to the first and second compound polygons respectively.

In an alternative embodiment (which is called "comparison mode based on polygons"), the similarity between two geometric figures is evaluated by comparing said geometric figures taken as a whole, independently of whether they are base triangles or compound polygons.

Furthermore, in an embodiment of the present invention, the similarity criterion evaluates the presence or absence of similarity between pairs of geometric figures (i.e. between two base triangles, between a base triangle and a compound triangle, between two compound triangles) based on a comparison between the digital values associated to some or all of the pixels of the image located near the vertices of the geometrical figure whose similarity is to be evaluated. For the purposes of this description, vertices of a compound polygon means the set of vertices of all the base triangles comprised in the compound polygon.

In an embodiment of the present invention, in order to evaluate the similarity of a compound polygon with another geometric figure, from said compound polygon (i.e. including several base triangles, obtained from the merging, even in several steps, of two or more base triangles) both the digital values of the vertices belonging to the external perimeter (external vertices) of the compound polygon and the digital values of the vertices of the base triangles included in said compound polygon, not necessarily external vertices of said compound polygon, can be taken into consideration.

In the case of a gray-scale image, a single digital value representative of the intensity parameter "gray level" are associated with each pixel (vertex). In this case, the similarity criterion is able to evaluate the absence or presence of similarity between two geometrical figures on the basis of a comparison between the levels of gray associated to the pixels of the image located near the vertices (internal or external) of said geometric figures. On the other hand, in the case of a color image, for example in YCbCR format, three digital values representing intensity parameters "luminance", "blue chrominance" and "red chrominance" are respectively associated with each pixel (vertex). In this case, the similarity criterion is able to evaluate the absence or presence of similarity between two geometric figures on the basis of separate comparisons between the different intensity parameters associated to the image pixels located near the vertices (internal or external) of said geometric figures.

Preferably, the evaluation of the similarity between a first and a second geometric figure comprises the following steps:
   assignment of an intensity measurement (scalar or vector) to each of said figures, calculated on the basis of digital values associated to the respective vertices of said figures;
   evaluation of the absolute or relative difference (scalar or vector) between the intensity measurement (scalar or vector) assigned to the first geometric figure and the intensity measurement (scalar or vector) assigned to the second geometric figure;
   verification whether or not said difference meets the predetermined similarity criterion.

More preferably, in the case where the geometric figure is a base triangle, an intensity measurement (scalar or vector) is assigned to said figure, obtained by calculating the average (scalar or vector) of the digital values associated to the pixels corresponding to the vertices of the base triangle. For example, in the case of a monochromatic image, for example gray-level, the result of said average is a digital value corresponding to the arithmetic mean of the three digital values (gray levels) associated to the three vertices of the base triangle respectively. However, in the case of a color image, said average is a vector comprising three digital values each of which is obtained from an average of three digital values representative of one single intensity parameter.

In the case of a compound polygon, however, said measurement can be assigned:
   in the case of merging based on base triangles, selecting a base triangle included in the polygon and assigning to said base triangle an intensity measurement calculated as described above for a base triangle;
   in the case of merging based on polygons, by selecting the vertices of the compound polygon belonging to the external perimeter (external vertices) and using the digital values associated to them in order to calculate the arithmetic mean (scalar or vector); or by selecting all the vertices (internal and external) of the compound polygon and using the digital values associated to them in order to calculate the arithmetic mean (scalar or vector).

More preferably, but non-limiting, in the case where the intensity measurement is obtained as an average of the digital values associated to all the vertices (internal and external) of the compound polygon, said average is a weighted arithmetic mean where the external vertices (or rather, the digital values associated to them) are weighted differently from the internal vertices.

It was observed that the best results are obtained by:
   assigning a greater weight to the external vertices if these are more numerous than the internal vertices in the compound polygon;
   assigning a greater weight to the internal vertices if these are more numerous than the external vertices in the compound polygon.

Once an intensity measurement (scalar or vector) has been assigned to the two geometric figures, the similarity between the two figures is evaluated by comparing said measurements and, in particular, the presence of similarity is established by evaluating if an absolute or relative difference (scalar or vector) between said measurements (or any other measurement proportional to said difference) is lower than a predetermined maximum value.

In an embodiment of the present invention, in the case of a color image, for example in YCbCR format, once a vector intensity measurement $M1=(M1_Y, M1_{Cb}, M1_{Cr})$ has been assigned to the first figure (for example, a first base triangle), and once a vector intensity measurement $M2=(M2_Y, M2_{Cb}, M2_{Cr})$ has been assigned to the second figure (for example, a second base triangle), the similarity between said figures can be affirmed if these three conditions are met:

$$|M1_Y - M2_Y| \leq \tau_Y(i) * \max\_\Delta_Y;$$

$$|M1_{Cb} - M2_{Cb}| \leq \tau_{Cb}(i) * \max\_\Delta_{Cb};$$

$$|M1_{Cr} - M2_{Cr}| \leq \tau_{Cr}(i) * \max\_\Delta_{Cr};$$

where:
   $M1_Y$ is a digital value that represents an intensity measurement of the parameter Y of the first base triangle, i.e. of its luminance, calculated for example as the arithmetic mean of the three digital luminance values associated respectively to the three pixels located near the vertices of the first base triangle;
   $M1_{Cb}$ is a digital value that represents an intensity measurement of the parameter Cb of the first base triangle, i.e. of its blue chrominance, calculated for example as the arithmetic mean of the three digital blue chrominance values associated respectively to the three pixels located near the vertices of the first base triangle;

$M1_{Cr}$ is a digital value that represents an intensity value of the parameter Cr of the first base triangle, i.e. of its red chrominance, calculated for example as the arithmetic mean of the three digital red chrominance values associated respectively to the three pixels located near the vertices of the first base triangle;

where $M2_Y$, $M2_{Cb}$, $M2_{Cr}$ are three digital values representing an intensity measurement of the parameter Y, of the parameter Cb and of the parameter Cr respectively of the second triangle (calculated in the same way as described above for the digital values $M1_Y$, $M1_{Cb}$, $M1_{Cr}$)

$\tau_Y(i)$, $\tau_{Cb}(i)$, $\tau_{Cr}(i)$, represent at iteration (i), differential percentage values, or thresholds, for the components Y, Cb and Cr and represent input parameters for the similarity criterion;

$\max\_\Delta_Y$, $\max\_\Delta_{Cb}$, $\max\_\Delta_{Cr}$, represent maximum difference digital values to be found on components Y, Cb and Cr respectively. For example, if the intensity digital values for the three components are represented by eight bits, the result is:

$$\max\_\Delta_Y = \max\_\Delta_{Cb} = \max\_\Delta_{Cr} = 255.$$

The above-described similarity criterion is a criterion based on separate evaluations for the three components of the respective absolute differential percentages between the first and the second geometric figure, in short an Absolute Difference Separated Ratio (ADSR) similarity criterion.

Advantageously, by choosing different input parameter values $\tau_Y(i)$, $\tau_{Cb}(i)$, $\tau_{Cr}(i)$, or thresholds, it is possible to evaluate the similarity of the two figures by using different similarity criteria for the different intensity components of the image, so that a greater degree of similarity is required for the image component that is more important from a perceptive point of view, which in this example is the component Y. For example, it can be said $\tau_Y(i) \leq \tau_{Cb}(i) = \tau_{Cr}(i)$.

Furthermore, in a preferred embodiment, said thresholds (or input parameters) can be modified between one iteration step (step i) and the next (step i+1), for example so that:

$$\tau_Y(i+1) = \tau_Y(i) + \tau_{step};$$

$$\tau_{Cb}(i+1) = \tau_{Cb}(i) + \tau_{step};$$

$$\tau_{Cr}(i+1) = \tau_{Cr}(i) + \tau_{step};$$

where $\tau_{step}$ is a positive value and represents a threshold incremental step. Alternatively, it is also possible to provide for different increments for the different components Y, Cb, Cr.

In an embodiment of the present invention, the incremental step $\tau_{step}$, can be varied between the different iterations, to ensure small threshold increments for the first iterations and greater threshold increments for subsequent iterations.

In an embodiment of the present invention, the polygonization step I_Pol terminates at iteration x where at least one of the input parameters of the similarity criterion satisfies a predetermined termination condition.

For example, in the case where the similarity criterion is ADSR, the termination condition is expressed by:

$$\tau_Y(x) \geq \tau_{max}$$

where $\tau_{max}$ is a predetermined threshold value, which represents the maximum threshold used for the luminance component. By varying the parameter $\tau_{max}$ of the similarity criterion, it is possible to select the final degree of approximation desired for the polygonized image $Img_P$.

In accordance with the diagram shown in FIG. 1, the polygonized image $Img_P$ of the block I_Pol, is then sent to the input of block I_Smp, suitable to carry out a simplification step of the compound polygons comprised in said image and output a simplified polygonized and vectorized image $Img_{Vet}$.

Figure 6:
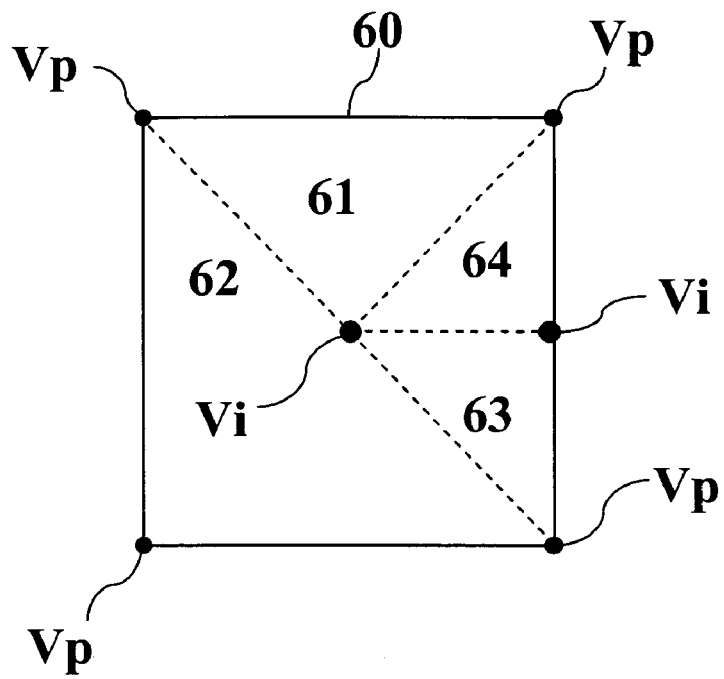
FIG. 6 shows an example of a non-simplified polygon.
Figure 7:
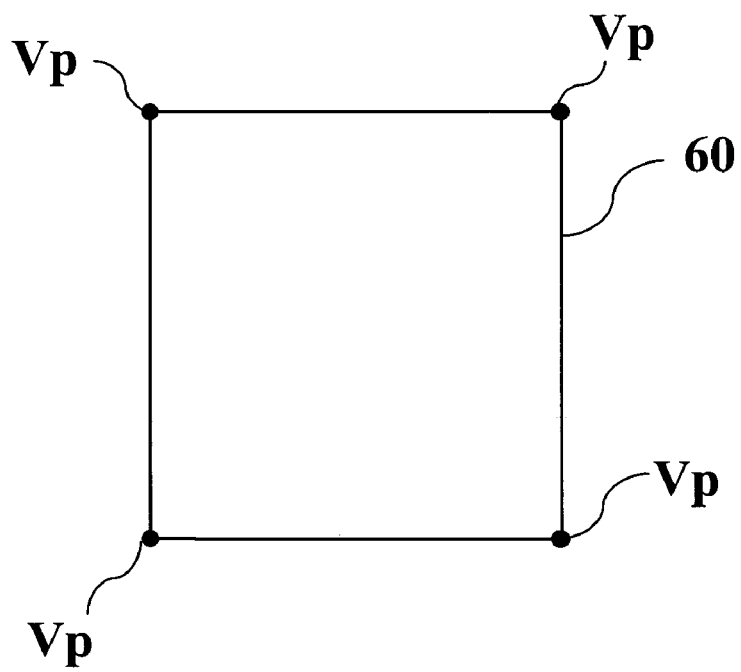
FIG. 7 shows a polygon obtained by simplification of the polygon in FIG. 6.

With reference to FIG. 6, it should be noted that a compound polygon 60 obtained from the merging of several base triangles 61, 62, 63, 64 includes vertices Vp that are proper vertices of the polygon but it can also include improper vertices Vi (points on the external perimeter of the polygon that are points where a pair of external sides of the polygon intersect). The polygon simplification step carried out in the block I_Smp makes it possible to eliminate the "superfluous" vertices Vi, so as to reduce the number of polygon vertices to the minimum indispensable. FIG. 7 shows the polygon 60 in FIG. 6 after the simplification operation.

Inside said block I_Smp, once the simplification step has been carried out, a step to map the simplified polygons can be provided in order to obtain a vector representation image $Img_{Vet}$.

Finally, returning to the diagram in FIG. 1, a further block is preferably provided in order to reconvert the vector converted image $Img_{Vet}$ with polygon intensity parameters in format Y, Cb, CR, into a vector converted image $Img_{DEF}$ with polygon intensity parameters in format R, G, B. This conversion of intensity parameters can be carried out using conversion formulae already known in the art and, therefore, is not further described herein.

Figure 8:
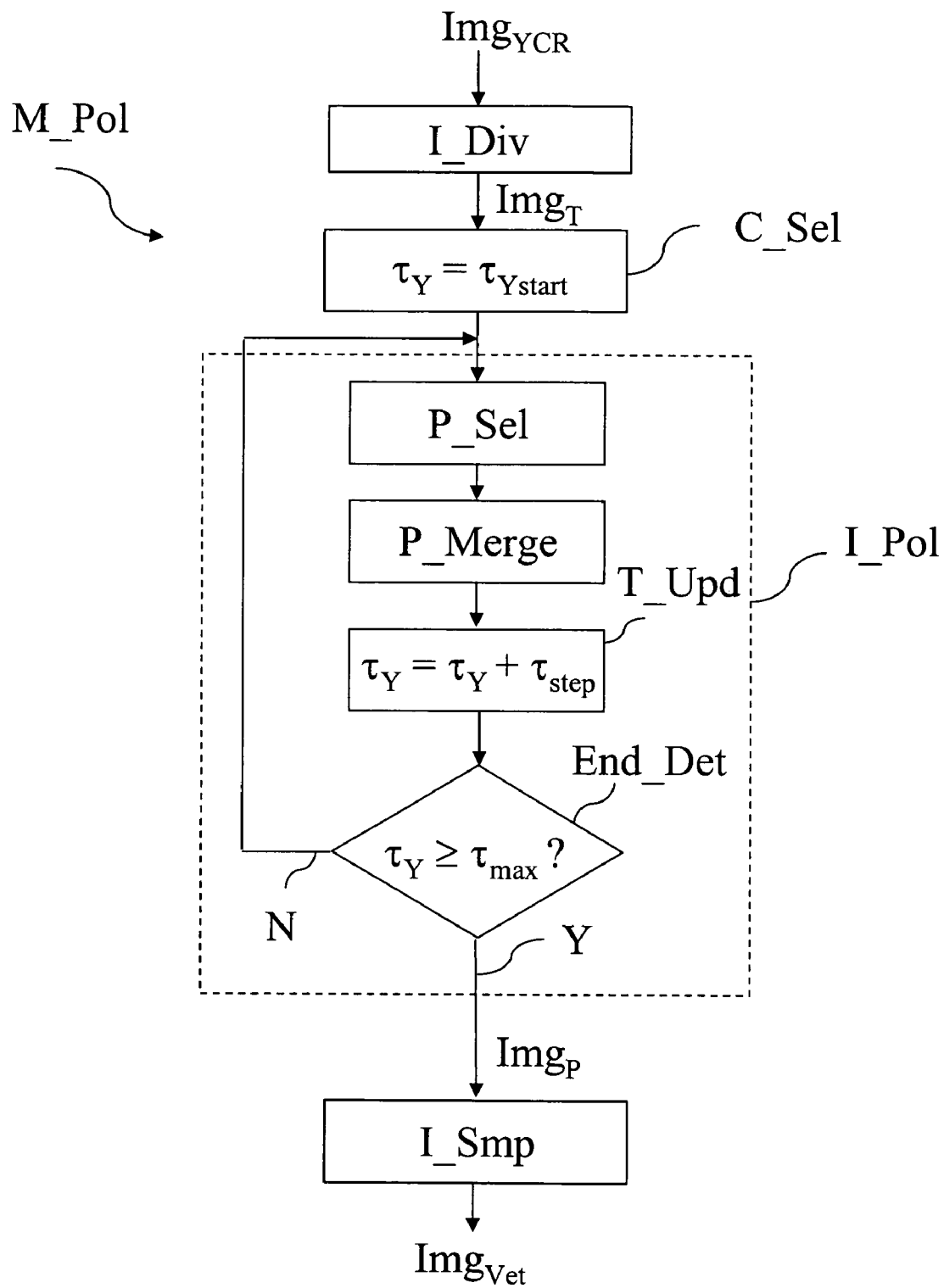
FIG. 8 schematically shows a flow diagram comprising a succession of processing operations included in a raster to vector conversion method according to the present invention.

FIG. 8 schematically shows a flow diagram where some steps or operations of the raster to vector conversion method M_Pol are illustrated. With reference to said flow diagram, which in some aspects is simplified compared to the diagram in FIG. 1 while in other aspects it is even more detailed, an example of the functioning of the raster to vector conversion method M_Pol is briefly explained.

For reasons of simplicity and clarity, a non-limiting hypothesis is made where the initial image $Img_{YCR}$, comprising a pixel matrix, is already in YCbCr format and is such that Cr=0 and Cb=0 for all the pixels. In practice, the initial image is a gray-scale image.

By means of the operation I_Div, by dividing the initial digital image into a plurality of base triangles (T1, ..., T31), a digital image is formed divided into polygons $Img_T$ (polygons which, therefore, exclusively comprise triangles).

Once the similarity criterion has been defined (whose "strength" or "weakness" can be varied, or rather adjusted, by means of at least one input parameter $\tau_Y$) in the operation C_Sel, said input parameter $\tau_Y$ is set (or initialized) to an initial value $\tau_{Ystart}$. Preferably, the similarity criterion is an ADSR similarity criterion and the input parameter $\tau_Y$ represents, in this particular case, an acceptable maximum absolute difference percentage between the luminance intensities of two polygons for these to be judged similar.

After the initialization step C_Sel, an iterative step (I_Pol) starts which processes the image divided into polygons (which initially are only base triangles), carrying out the following operations:

Selecting P_Sel at least a first and a second polygon adjacent to each other that satisfy said similarity criterion;

merging P_Merge the first and the second selected polygons in order to generate a new digital image divided into polygons and comprising at least one new polygon formed by the merging of said first and second selected polygons.

At the end of the merging operation, a step T_Upd updates the input parameter $\tau_y$, for example by increasing it by a predetermined quantity $\tau_{step}$.

A subsequent step End_Det checks if a termination condition of the iterative part I_Pol of the processing operation has been met (e.g. the updated input parameter is compared to a predetermined maximum value). If the termination condition is satisfied (in figure, arrow Y), the iterative step terminates and a subsequent step I_Smp for simplification, of the polygons is carried out.

If the termination condition is not satisfied (in figure, arrow Y), the iterative step I_Pol is repeatedly carried out until the predetermined termination condition is reached.

Experimental tests performed on a high number of image samples, both of the photographic type and containing text, have demonstrated that the raster to vector conversion method according to the invention, if compared to the raster to vector conversion methods belonging to the state of the art (also software currently available on the market), can provide better performance both in terms of perceived quality and in terms of measured quality.

Naturally, in order to satisfy contingent and specific requirements, a person skilled in the art may apply to the above-described raster to vector conversion method according to the invention many modifications and variations, all of which, however, are included within the scope of protection of the invention as defined by the following claims.

We claim:

1. A computer-implemented, raster to vector conversion method of an initial digital image comprising a pixel matrix, the method comprising:
    using a computer to perform the following steps:
    generating a digital image divided into polygons by dividing the initial digital image into a plurality of base triangles;
    defining a similarity criterion depending on at least one parameter;
    storing in memory said similarity criterion and said at least one parameter; and performing an iterative operation comprising:
    selecting at least a first polygon and a second polygon adjacent to each other and which satisfy said similarity criterion;
    merging said first polygon with said second polygon in order to generate a new digital image divided into polygons and comprising at least one new A polygon formed by the merging of said at least first polygon and second polygon; and
    updating in memory said at least one parameter of the similarity criterion, wherein the digital image divided into polygons is said new generated image and wherein the similarity criterion depends on the modified parameter.

2. The computer-implemented raster to vector conversion method according to claim 1 further comprising determining if a predetermined termination condition of said iterative operation has been satisfied.

3. The computer-implemented raster to vector conversion method according to claim 1, wherein said generating is performed in accordance with a data dependent triangulation technique of the locally optimal type.

4. The computer-implemented raster to vector conversion method according to claim 1 wherein said generating is performed in accordance with a triangulation technique based on wavelets.

5. The computer-implemented raster to vector conversion method according to claim 1, wherein:

said first polygon comprises a compound polygon including at least a first and a second base triangle;
said second polygon comprises a further base triangle adjacent to said first base triangle; and
said selecting checks if said similarity criterion is satisfied by comparing said first and said further base triangle.

6. The computer-implemented raster to vector conversion method according to claim 1, wherein said similarity criterion is coupled to a similarity requirement that is made less demanding between two successive iterations of said operation to update said at least one parameter.

7. The computer-implemented raster to vector conversion method according to claim 1, wherein said similarity criterion evaluates the presence or absence of a similarity property between said first polygon and said second polygon on the basis of a comparison of the digital values associated to at least some of the pixels of the initial image located near the vertices of said first and said second polygon.

8. The computer-implemented raster to vector conversion method according to claim 7, wherein said vertices comprise the vertices of the external perimeter of said polygons.

9. The computer-implemented raster to vector conversion method according to claim 8, wherein said vertices further comprise the vertices of the base triangles included in said polygons that do not belong to said external perimeter.

10. The computer-implemented raster to vector conversion method according to claim 1, wherein said selecting comprises: assigning a respective intensity measurement, scalar or vector, to said first and said second polygon, calculated on the basis of digital values associated to the respective vertices of said polygons;
    evaluating a difference, scalar or vector, absolute or relative, between the intensity measurement assigned to the first polygon and the intensity measurement assigned to the second polygon; and
    verifying whether or not said difference satisfies the predetermined similarity criterion.

11. The computer-implemented raster to vector conversion method according to claim 10, wherein said similarity criterion comprises an ADSR (Absolute Difference Separated Ratio) type similarity criterion.

12. The computer-implemented raster to vector conversion method according to claim 1 further comprising a simplification operation of the polygons in said image divided into polygons, in order to eliminate the vertices of said compound polygons that are not proper to said polygons.

13. A computer-readable storage medium tangibly embodying a program of instructions executed by a machine, wherein said program of instructions comprises a plurality of program codes for raster to vector conversion of a digital image, said program of instructions comprising:
    program code for generating a digital image divided into polygons by dividing the initial digital image into a plurality of base triangles;
    program code for defining a similarity criterion depending on at least one parameter;
    program code for performing an iterative operation comprising:
        code for selecting at least a first and a second polygon adjacent to each other and satisfy said similarity criterion;
        code for merging said first polygon with said second polygon in order to generate a new digital image divided into polygons and comprising at least one new polygon formed by the merging of said at least first and second polygon; and code for updating said at least one parameter of the similarity criterion, wherein the digital image divided into polygons is said new generated image and wherein the similarity criterion depends on the modified parameter.

14. The computer-readable storage medium according to claim 13, wherein said program of instructions further comprises program code for determining if a predetermined termination condition of said iterative operation has been satisfied.

15. The computer-readable storage medium according to claim 13, wherein said code for generating a digital image is performed in accordance with a data dependent triangulation technique of the locally optimal type.

16. The computer-readable storage medium according to claim 13, wherein said code for generating a digital image is performed in accordance with a triangulation technique based on wavelets.

17. The computer-readable storage medium according to claim 13, wherein:
said first polygon comprises a compound polygon including at least a first and a second base triangle;
said second polygon comprises a further base triangle adjacent to said first base triangle; and
said code for selecting checks if said similarity criterion is satisfied by comparing said first and said further base triangle.

18. The computer-readable storage medium according to claim 13, wherein said similarity criterion is coupled to a similarity requirement that is made less demanding between two successive iterations of said operation to update said at least one parameter.

19. The computer-readable storage medium according to claim 13, wherein said similarity criterion evaluates the presence or absence of a similarity property between said first polygon and said second polygon on the basis of a comparison of the digital values associated to at least some of the pixels of the initial image located near the vertices of said first and said second polygon.

20. The computer-readable storage medium according to claim 19, wherein said vertices comprise the vertices of the external perimeter of said polygons.

21. The computer-readable storage medium according to claim 20, wherein said vertices further comprise the vertices of the base triangles included in said polygons that do not belong to said external perimeter.

22. The computer-readable storage medium according to claim 13, wherein said code for selecting comprises:
assigning a respective intensity measurement, scalar or vector, to said first polygon and said second polygon, calculated on the basis of digital values associated to the respective vertices of said polygons;
evaluating a difference, scalar or vector, absolute or relative between the intensity measurement assigned to the first polygon and the intensity measurement assigned to the second polygon; and
verifying whether or not said difference satisfies the predetermined similarity criterion.

23. The computer-readable storage medium according to claim 22, wherein said similarity criterion comprises an ADSR (Absolute Difference Separated Ratio) type similarity criterion.

24. The computer-readable storage medium according to claim 13 further comprising a simplification operation of the polygons in said image divided into polygons, in order to eliminate the vertices of said compound polygons that are not proper to said polygons.

* * * * *